A. BALL.
MINING MACHINE.
APPLICATION FILED OCT. 15, 1906.

1,185,278.

Patented May 30, 1916.
7 SHEETS—SHEET 5.

Witnesses,
Jesse A. Holton
Robert H. Kammler

Inventor:
Albert Ball
by Emery & Booth
Attys.

A. BALL.
MINING MACHINE.
APPLICATION FILED OCT. 15, 1906.
1,185,278.
Patented May 30, 1916.
7 SHEETS—SHEET 6.
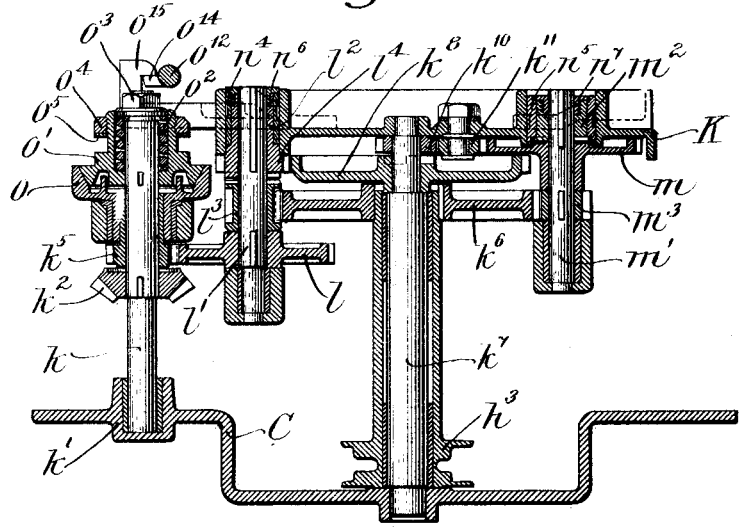
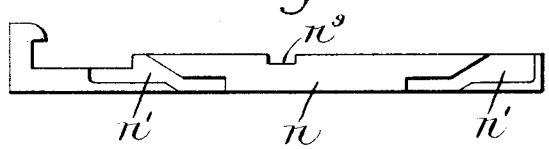
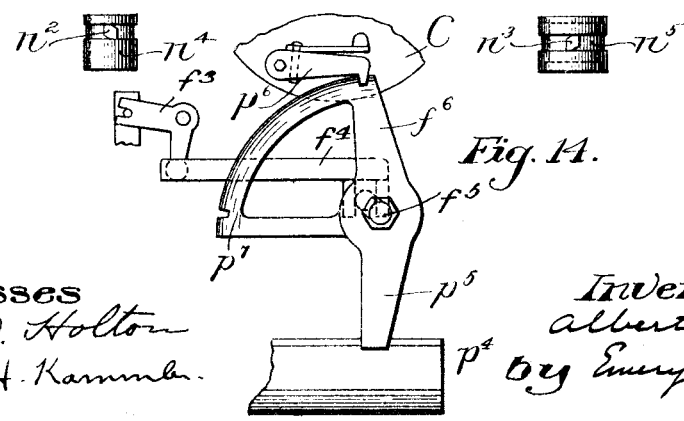
Witnesses
Jesse A. Holton
Robert H. Kammler
Inventor:
Albert Ball
by Emery Booth
Atty's

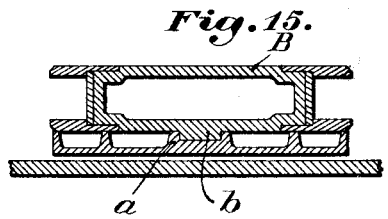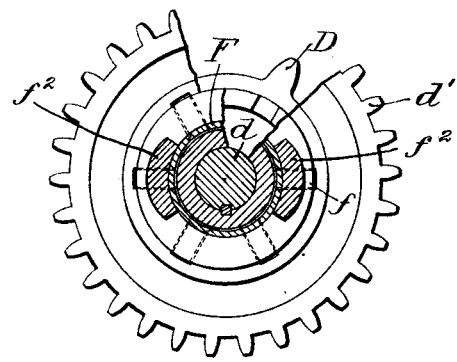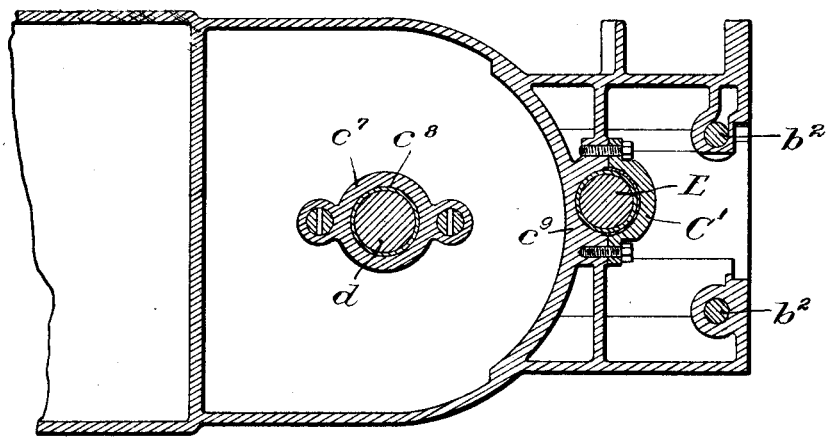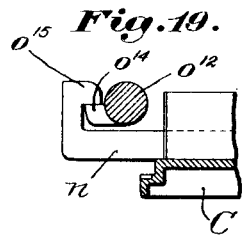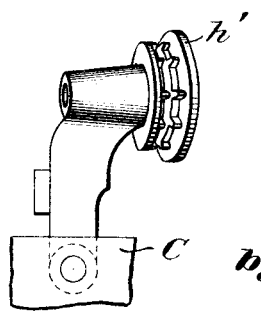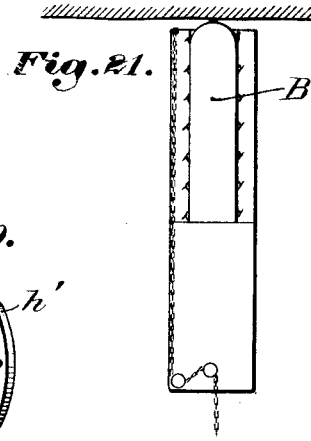

UNITED STATES PATENT OFFICE.

ALBERT BALL, OF CLAREMONT, NEW HAMPSHIRE, ASSIGNOR, BY MESNE ASSIGNMENTS, TO SULLIVAN MACHINERY COMPANY, OF BOSTON, MASSACHUSETTS, A CORPORATION OF MASSACHUSETTS.

MINING-MACHINE.

1,185,278.   Specification of Letters Patent.   Patented May 30, 1916.

Application filed October 15, 1906. Serial No. 338,904.

*To all whom it may concern:*

Be it known that I, ALBERT BALL, a citizen of the United States, residing at Claremont, in the county of Sullivan and State of New Hampshire, have invented an Improvement in Mining-Machines, of which the following description, in connection with the accompanying drawings, is a specification, like letters on the drawings representing like parts.

My invention relates to mining machines and more particularly to machines provided with cutting mechanism and which are fed toward or along the wall in which the cut or perforation is being made.

Among the objects of my invention are improved means for controlling and handling such machines and particularly improved constructional features providing a machine of compact form, great strength and effectiveness and convenience of arrangement, all of which are points of great desirability in machines of this class.

My invention will be best understood by reference to the following description when taken in connection with the accompanying illustration of one specific embodiment thereof, while its scope will be more particularly pointed out in the appended claims.

Figure 1:
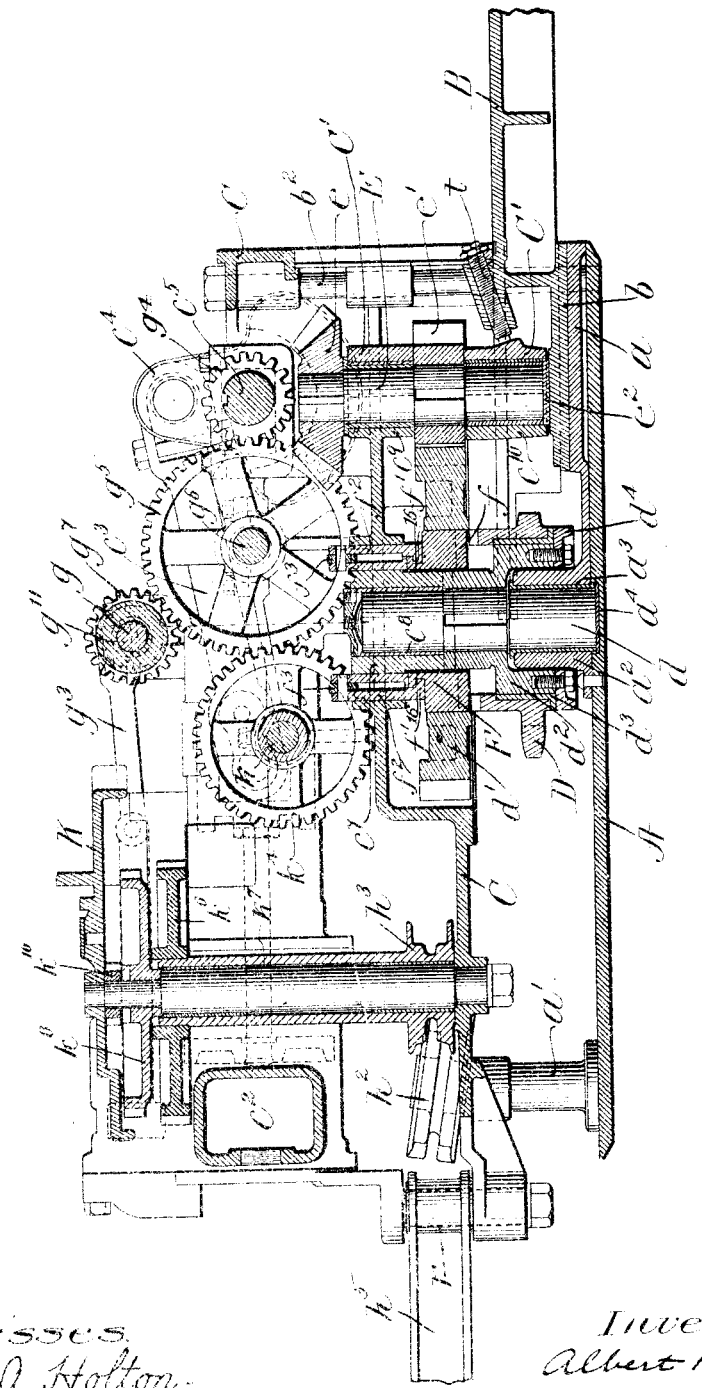
Figure 2:
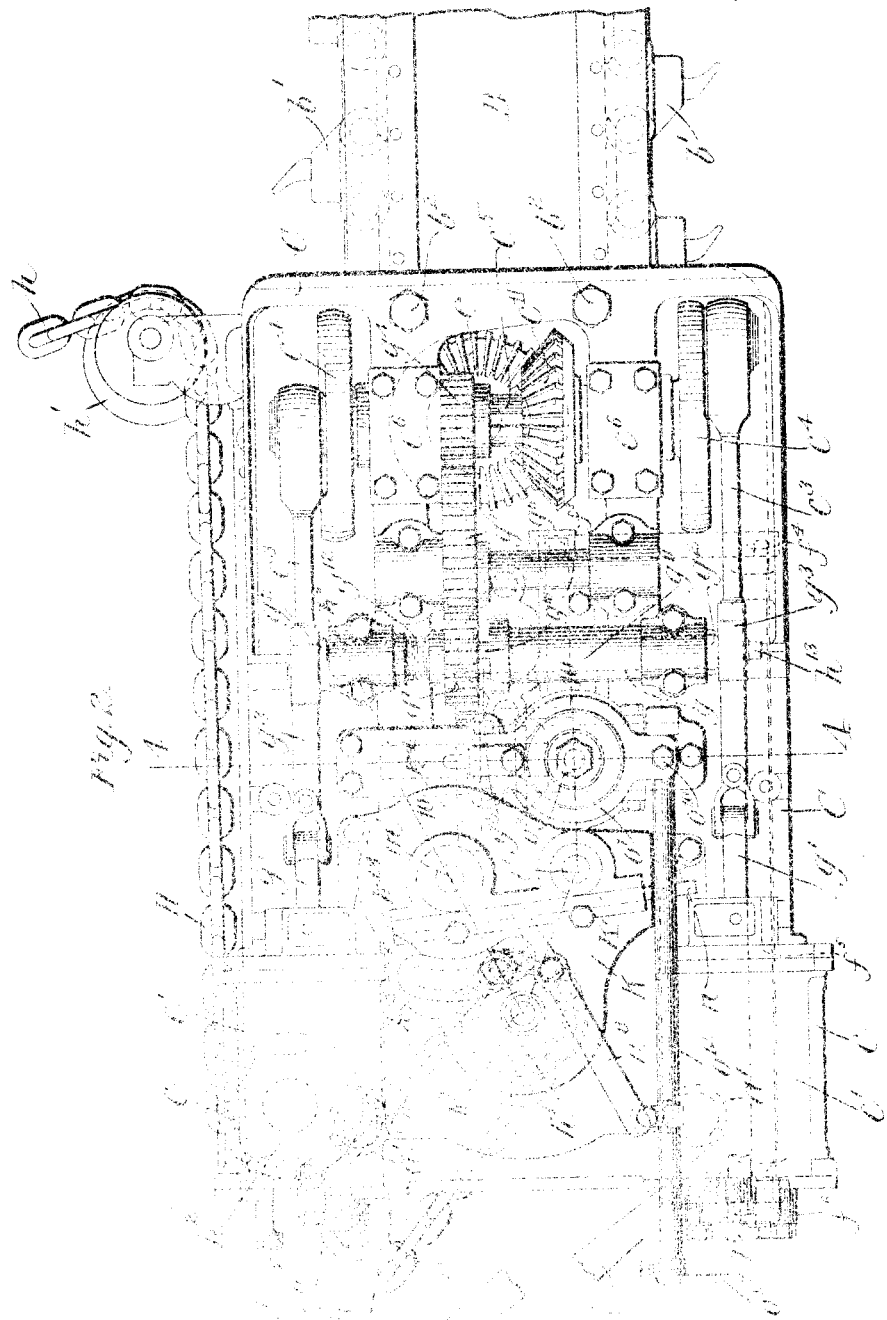
Figure 3:
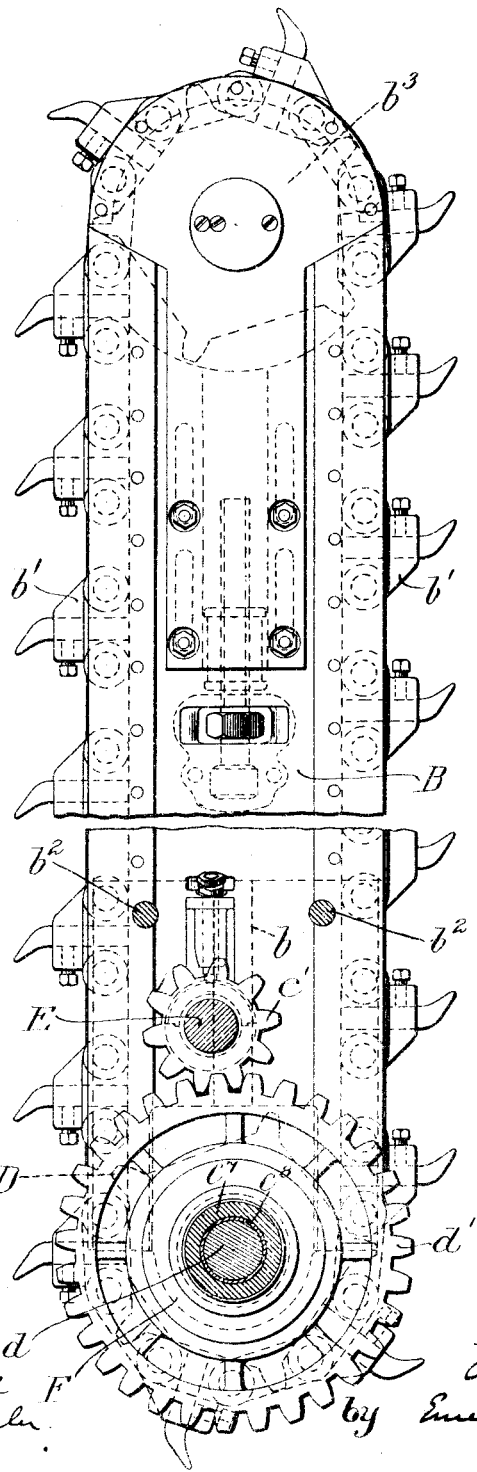
Figure 4:
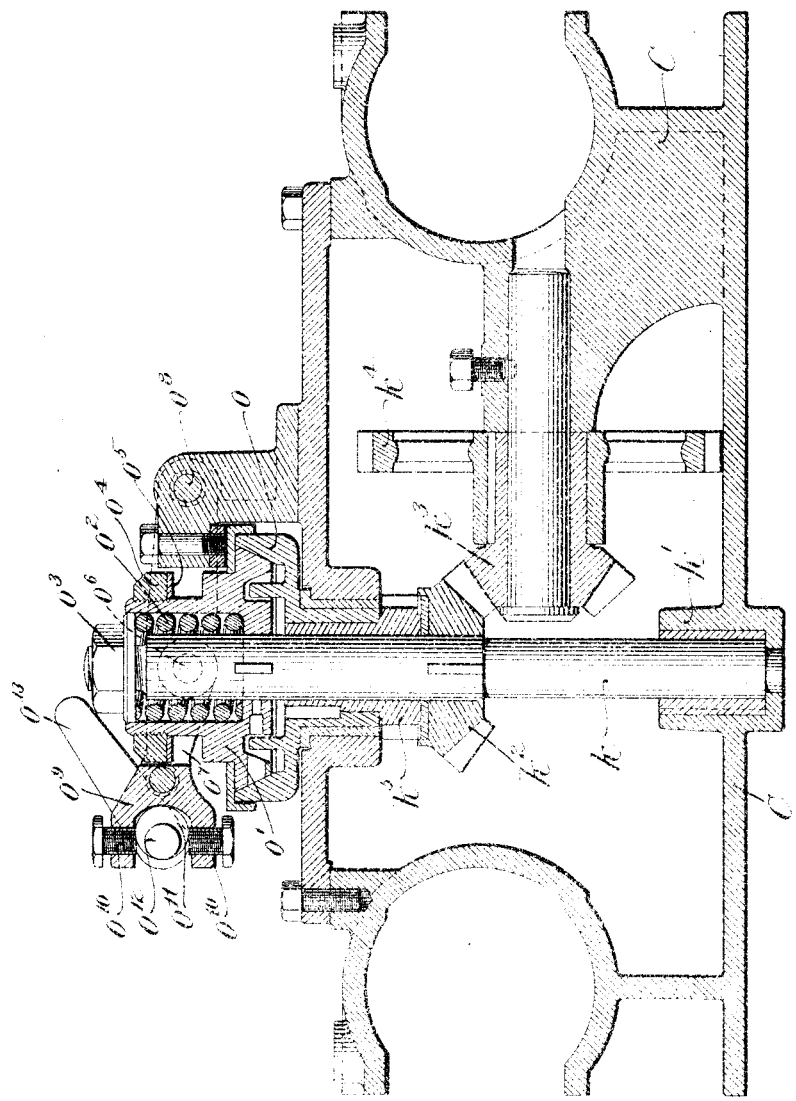
Figure 5:
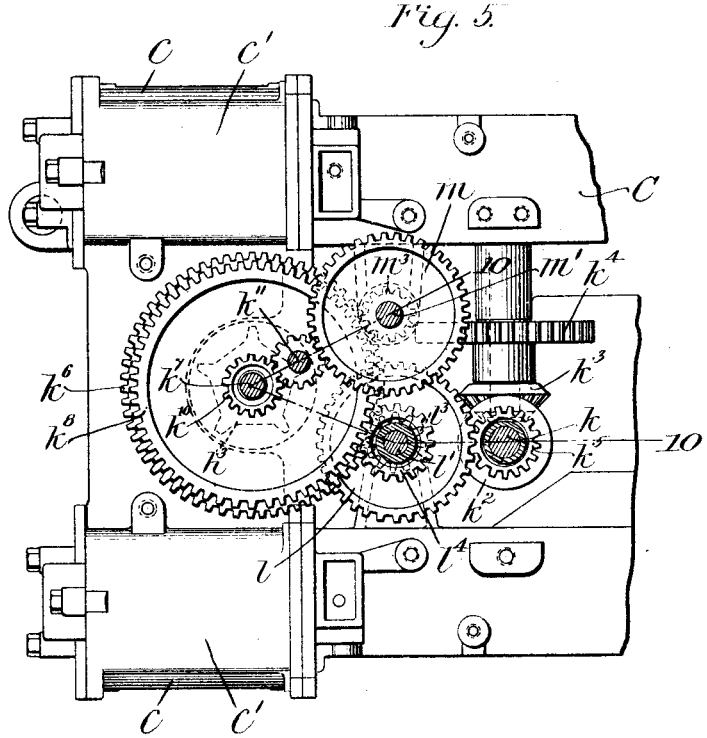
Figure 6:
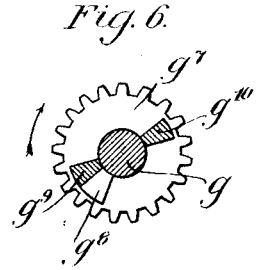
Figure 7:
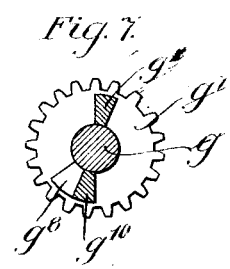
Figure 8:
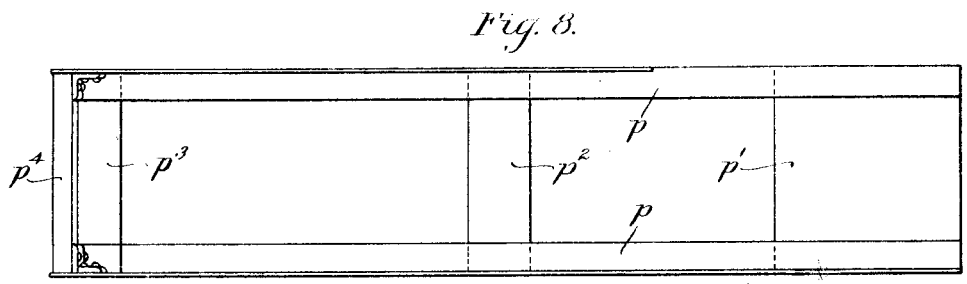
Figure 9:
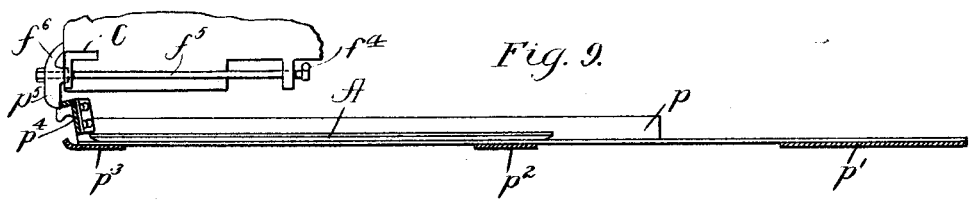

In the drawings, Figure 1 is a sectional elevation taken through the longitudinal center of the machine with a portion of the cutter bar partially broken away and showing the transmission gearing for the cutting mechanism; Fig. 2 is a plan view of the mining machine shown in Fig. 1 with the cutter bar partially broken away; Fig. 3 shows in plan, partially broken away, the cutter bar for the mining machine illustrated in Fig. 1, together with the cutter chain and a portion of the driving gearing; Fig. 4 is a cross-section on an enlarged scale, taken on the line 4—4 in Fig. 2; Fig. 5 is a plan view of the gear of the mining machine showing the feed transmission gearing in plan; Fig. 6 is a sectional elevation taken through the valve crank shaft and showing the clutch members of the crank shaft in one relation; Fig. 7 is a similar view showing them in another relation; Fig. 8 is a plan view of the starting frame; Fig. 9 is a side elevation thereof with a portion of the machine shown in position therein; Fig. 10 is a section taken on the irregular line 10—10 in Fig. 5 showing the feed transmission gearing; Fig. 11 shows the cam slide rod; Fig. 12, one of the clutch gear sleeves; Fig. 13, the other clutch gear sleeve; Fig. 14 is an end view of the starting frame showing the interlocking action of the main clutch lever; Fig. 15 is a transverse sectional elevation showing a part of the bottom plate and the tongue and groove connection of the cutter bar thereto; Fig. 16 is a sectional plan, partly broken away, on the line 16—16, Fig. 1, showing the relation of the clutch to the sprocket wheel driving gear; Fig. 17 is a sectional elevation of the squared end of the valve controlling shaft; Fig. 18 is a section in plan, partly broken away, and taken through the upper frame member C; Fig. 19 is a detail in sectional elevation showing the locking device for the feed gearing control; Fig. 20 is a perspective view showing the pivoted sheave bracket, and Fig. 21 is a diagrammatic view of the machine as arranged for making the starting cut.

In the drawings I have shown, for the purpose of illustrating the various features of my invention, an air-driven chain mining machine of the so-called "room and pillar" type. It is to be understood, however, that although my invention presents marked improvements related to this particular type of machine, in many of its features, and combinations of features, it has, and is intended to have, general and broad application to mining machines of other and quite dissimilar types and to machines employing motive power other than air.

In the specific type of machine which is herein shown there is provided a cutter bar, extending from and longitudinally fixed upon one end of the machine which bar affords suitable guidance for the cutter chain. This particular machine, although capable of being transported from one place to another upon tracks, during the cutting operation is caused to feed automatically, first longitudinally into the coal, and then transversely thereof, under its own power and through engagement with a suitably connected feeding chain. In the specific type of machine here illustrated lateral travel is occasioned without the assistance of a trackway or the like, the machine being caused to slide along the mine bottom upon a suitable bottom plate or shoe.

Referring to the drawings and to the specific embodiment of the invention there shown, the principal operative parts are mounted on and firmly secured to an underlying frame member which here consists of the flat bottom plate or shoe A, of wrought iron or other suitable material, to one face of which is rigidly attached, as by riveting, the bed plate $a$. The bottom plate A is preferably of sufficient size to afford a good sliding support for the machine and prevent it from settling or sinking into the soft spots or irregularities in the mine bottom. Although formed of two separate pieces in the illustrated machine if desired, the frame member comprising the bed and bottom plates might be formed in a single piece only.

The lower frame member gives direct and rigid support to the cutter bar B as well as the main frame or casting C. For the purpose of holding the cutter bar in place the latter is provided with a depending longitudinal tongue $b$ (Fig. 1) which is adapted to fit into and interlock with a corresponding longitudinal groove in the upper face of the bed plate $a$, so that when bolted or otherwise held to the bed plate the cutter bar offers the most effective resistance to lateral displacement.

The principal driving members of the machine are either supported upon or alined with reference to the main frame C, which is supported upon the cutter bar near the forward end of the machine and secured directly to the bottom plate at the rear end of the machine upon the posts or pillars $c'$. In the main frame at either side thereof are formed the engine cylinders $c$, $c$, and on the top of the cylinders the valve chambers $c'$, $c'$. The main frame also provides bearings for the crank shaft, feed transmission gearing and other power transmitting members.

Compressed air is led by flexible connecting pipes from any suitable source of supply (not shown) to the receiving chamber $c^2$ (Fig. 1), whence it is distributed to the supply chambers of the two engines.

The engine piston rods (Fig. 2) are each connected to a cross-head and suitable connecting rods $c^3$, the latter being attached to the cranks $c^4$ on the main crank shaft $c^5$, which latter is journaled in boxes $c^6$ and acts as the main driving shaft of the machine, from which driving movement is transmitted both to the cutting mechanism at the cutter bar and the feeding gearing which latter is here located at the rear of the machine and between the engine cylinders.

Referring first to the cutter chain and its driving connection, the cutter chain B (Figs. 2 and 3) is mounted to travel along guides ways on the cutter bar B, the latter securely held to the bottom plate by the tongue and groove connection described and a pair of upright bolts $b^2$, which (Figs. 1, 2 and 3) pass vertically through the forward end of the main frame and through the cutter bar into the underlying frame member. By withdrawing the bolts $b^2$ the cutter chain having first been removed, the entire cutter bar may be readily detached from the machine.

At the outer end of the cutter bar there is provided (Fig. 3) an idle sprocket wheel $b^3$, over which the chain passes. Near the opposite end of the cutter bar the chain passes over the driving sprocket wheel D, which latter is mounted near the central portion of the machine between the bottom of the main frame member and the bed plate to rotate with the upright sprocket wheel driving shaft $d$.

To drive the sprocket wheel the main crank shaft $c^5$ (Fig. 2) is provided with a beveled driving pinion $c^{11}$ which meshes with an underlying bevel gear $e$, the latter keyed to the upright and centrally located counter-shaft E (Fig. 1). The upright counter-shaft is provided with a driving pinion $e'$, meshing with the larger driving gear $d'$, the latter having the hub portion $d^2$, keyed or otherwise secured to the sprocket wheel driving shaft $d$. The sprocket wheel D is loosely and revolubly mounted upon the gear hub $d^2$, but may be clutched thereto or unclutched therefrom by the toothed clutching device F, which latter is vertically slidable upon a depending portion of the frame C which forms an encircling sleeve about the upper part of the sprocket wheel shaft. The sprocket wheel has the removable bushing or lining $d^3$ and is retained upon the hub of the gear by a flanged collar $d^4$, the latter being bolted to the lower end of the gear hub. The clutch member has depending toothed members $f$ working in vertical apertures passing entirely through the hub of the driving gear $d'$. The upper face of the underlying sprocket wheel hub is correspondingly notched as shown (Fig. 1), so that when depressed the clutch locks the sprocket wheel to the gear. It is shown in Fig. 1 in its elevated or inoperative position. The upper side of the clutch member is provided with a grooved collar engaged at each side by an arc-shaped foot $f'$ the latter carried by a depending plunger $f^2$, vertically slidable in the main frame and connected each to a rocker lever $f^3$ (shown in outline in Fig. 2). The latter is connected to the transverse slide rod $f^4$, and the latter in turn to the longitudinal rocker rod $f^5$, the end of which at the rear of the machine is provided with the operating handle $f^6$, whereby through the movement of the handle the clutch may be raised or lowered at will and the cutting mechanism thrown into or out of engagement with the driving mechanism.

In the present machine the transmission gearing for the cutter chain, which at times is obliged to withstand a very heavy load, is mounted in the firmest and most substantial fashion. The sprocket wheel driving shaft $d$ has a lower journal in the hub or bracket $a^2$ formed at the rear end of the bed plate $a$, there being provided for said bearing a removable lining $a^3$ and a step bearing $a^4$. An elongated upper journal bearing for the said shaft is provided by the portion $c^7$ on the main frame, the same also having the removable lining $c^8$. By the provision of the bearing, both above and below the sprocket wheel and above and below the driving gear $d'$, the shaft is maintained in a firm and accurate alinement. The counter-shaft E is also provided with an upper journaled bearing at $c^9$ and a lower journal bearing at $c^{10}$, these bearings being formed within the main frame C and the removable cap piece C' (Fig. 1) the upper end of which is bolted to the main frame and the lower end held against displacement by the set screw $t$. The lower end of the counter-shaft E rests upon a removable step bearing piece $e^2$, supported directly upon a part of the cutter bar B. This construction not only gives solidity to the transmission gearing for the cutting mechanism but the location of the parts gives an extremely compact formation to the machine, permitting it to be shortened to substantially the length taken up by the engine parts alone.

For the reversal of the engine when desired and to avoid the necessity of the usual eccentric and eccentric connections, there is provided a separate valve crank shaft $g$ which has operative connections at opposite ends with the valve rods $g'$ through the cranks $g^2$ and connecting rods $g^3$. This shaft is driven from the driving pinion $g^4$ on the main crank shaft and the intermeshing gear $g^5$, the latter upon the intermediate shaft $g^6$. Driving movement is transmitted to the valve shaft through the driving gear $g^7$ loosely mounted on the valve shaft and adapted to turn the same through a suitable clutching device. For this purpose (Fig. 2) the gear is provided with a lateral lug $g^8$ which is adapted to engage with either lug $g^9$ or $g^{10}$ (Figs. 6 and 7) extending laterally from the adjacent sleeve $g^{11}$ secured to the valve shaft. During operation of the engine the gear turns in one direction, for example as shown by the arrow in Fig. 6, and turns the shaft in the same direction by engagement between the lugs $g^8$ and $g^9$. If the engine is stopped it may then be reversed by merely turning the valve crank shaft ahead far enough to bring the lugs $g^{10}$ against the opposite face of the gear lug $g^8$, as above shown in Fig. 7. During operation overthrow of the valve shaft is prevented by the frictional hold maintained between the face of the sleeve and the spring $g^{12}$, which presses the slidably mounted gear against the face of the sleeve. The valve shaft may be turned by applying a wrench or other implement to its squared end $h^{13}$.

While other methods of feeding or causing travel of the machine during the cutting operation, or at other times, may be employed, I have herein shown the feed chain H, the leading end $h$ of which passes about a suitably positioned idle wheel or sprocket wheel $h'$ at the side but near the forward end of the machine, thence rearwardly about the idle sprocket $h^2$, thence over the centrally positioned driving sprocket wheel $h^3$. From thence it passes over the guiding sprocket wheel $h^4$, carried upon the adjustable bracket or arm $h^5$, whence it passes to and is fixedly secured to ratchet and pawl mechanism (not shown) by which the chain may be taken in or let out as desired. The leading end of the chain is secured to some fixed point, such as a usual anchor (not shown). By suitably positioning the ends of the feed chain the machine may be made to travel under its own power either longitudinally or laterally, and either for the cutting operation or for positioning the same about the mine floor.

To move the machine about the floor for positioning purposes it is preferable to employ a higher speed than is employed while the machine is performing the cutting operation and the sprocket wheel $h^3$ therefore may be driven at either one of two speeds. Referring more particularly to Figs. 1, 5 and 10, the feed transmission gearing is driven primarily from an upright feed driving shaft $k$ having a lower step bearing $k'$ in the frame C, and an upper journal bearing in an over head plate which extends between the engine cylinders. Movement is transmitted from the crank shaft to the shaft $k$ (Figs. 1, 2 and 4) through a train of gearing comprising the bevel gear $k^2$, keyed to the shaft $k$, and meshing with the beveled pinion $k^3$, the latter rotated by the spur gear $k^4$. The spur gear $k^4$ meshes directly with the counter-shaft gear $g^5$.

Referring more particularly to Fig. 10 (not intended to be constructionally accurate) driving movement is transmitted to the sprocket wheel $h^3$ through the train of gearing as follows: the shaft $k$ carries thereon the pinion $k^5$ driven through an overhead yieldable transmission device hereinafter described. The pinion $k^5$ meshes with an adjacent gear $l$, keyed to the upright high speed driving shaft $l'$ so that the latter is constantly rotated. Splined to the upper end of the shaft $l'$ to rotate therewith is a sliding clutch or member $l^2$ having a toothed lower face which may be depressed to clutch with and drive the pinion $l^3$, the latter having a toothed upper face. When thus clutched, the pinion $l^3$ drives directly the main sprocket-wheel-driving-gear $k^5$ which is keyed fast to the extended sleeve or hub of the sprocket wheel $h^3$, the latter being journaled upon the fixed sprocket wheel stud $k^7$.

For obtaining the slow feeding movement the constantly rotating clutch member $l^2$ has gear teeth $l^4$, which mesh with the large intermediate gear $k^8$, the latter loosely journaled upon a reduced or shouldered portion of the sprocket wheel stud. The gear $k^8$ has secured to it the smaller overhead pinion $k^{10}$, which meshes with the small idle pinion $k^{11}$, the latter driving the larger gear $m$, which is loosely journaled on the upright slow speed driving shaft $m'$. The gear $m$, which is thus constantly driven at a reduced rate of speed, may be clutched to drive the shaft $m'$ by depression of the sliding clutch member $m^2$, the latter, on depression, having toothed engagement with the upper face of the gear hub. When thus clutched, the shaft $m'$ drives the pinion $m^3$ which is keyed thereto, and the pinion meshing with the sprocket driving shaft $k^6$, drives the sprocket wheel $h^3$ at a relatively slow rate of speed. In other words, with the clutch member $l^2$ raised and the clutch member $m^2$ lowered, the sprocket wheel is driven at the slow or cutting speed. With the clutched member $l^2$ depressed and the clutch member $m^2$ raised the sprocket wheel is then driven at its higher or positioning speed.

To obtain speed reductions at the slow speed the gear plate or frame K may be removed, the pinion $k^{10}$ replaced by another and the pinion $k^{11}$ adjusted to a fresh position. For this purpose the pinion $k^{11}$ is carried upon a clamping stud adjustably clamped in an arc-shaped slot $k^{12}$ in the frame K (see Fig. 2) and pinion $k^{10}$ having merely an interlocking engagement with the gear $k^8$, may be readily withdrawn on removal of the gear plate.

For engaging or disengaging the clutch members at will there is provided the sliding controller rod $n$ (Fig. 11) having suitably formed cam grooves $n'$ in its face, which grooves are caused to engage lugs $n^2$ and $n^3$, respectively, carried by the sliding clutch members $l^2$ and $m^2$. The lugs $n^2$ and $n^3$ are formed respectively upon sleeves $n^4$ and $n^5$ (Figs. 12 and 13) and these sleeves are retained (Fig. 10) each upon a reduced portion of its respective clutch member by flanged threaded caps $n^6$, $n^7$. The formation of the cam grooves is such that when the rod is moved to the right, as shown in Fig. 10, the clutch member $m^2$ is depressed and the clutch member $l^2$ raised giving the slow cutting speed. When moved to the left a reverse condition follows giving the high speed. The rod $n$ slides in guide-ways $K'$ formed in the top of the plate K and is moved in one direction or the other by the hand lever $n^8$ (Fig. 2) pivoted to the plate and having its end engaging a notched portion $n^9$ in the top of the rod.

To prevent excessive strain upon the feeding chain during cutting there is interposed (Figs. 2, 4 and 10) between the upright driving shaft $k$ and the sprocket wheel a yieldable transmission device which permits slippage when a safe load for the feeding chain is exceeded. This comprises a cup-shaped driven member $o$ keyed to the driving pinion $k^5$ and having a cone-shaped friction surface engaging with a driving member $o'$, which latter is splined to the driving shaft but free to slide lengthwise the same. During cutting these two members are pressed together by a spring $o^2$, seated in a pocket in the driving member $o'$, the pressure of said spring being regulated by an adjusting nut $o^3$, which may be set to the degree of compression required for transmitting the desired load.

In moving the machine about at the higher speed in order to avoid slippage at the transmission device there is provided means for placing pressure upon the transmission device in addition to that of the spring. For this purpose there is threaded on the upper end of the driving member $o'$ a nut $o^4$ which retains a washer $o^5$, between which and an underlying shoulder on the driving member there is formed a groove recess into which enters a pair of diametrically opposite pins $o^6$ carried by the swiveled ring frame $o^7$ (Fig. 2), the latter being pivoted at $o^8$ upon the machine. The opposite end of the ring frame, or that lying on the other side of the transmission member, has a forked portion $o^9$ (Fig. 4) carrying the two upright adjusting screws $o^{10}$ between which works the cam $o^{11}$, the latter carried by the cam shaft $o^{12}$. By turning the hand lever $o^{13}$ at the end of the cam shaft the cam $o^{11}$ may be turned to raise or lower the ring frame and therefore detract from or add to the pressure already exerted by the spring $o^2$. By merely depressing the ring frame through the handle $o^{13}$ the transmission device may be made to transmit more than the normally assigned load and thus avoid slippage at the high speed.

In order to prevent pressure in addition to that of the spring from being placed upon the transmission device during the cutting speed, the cam shaft $o^{12}$ (Fig. 10) may be provided with a lug $o^{14}$, which in the low speed position of the slide rod $n$ is caused to underlie an overhanging lug $o^{15}$ carried by said rod. This prevents movement of the cam shaft in a direction to increase the pressure on the transmission device when the machine is traveling at the slow cutting speed.

It will be understood that, during cutting operation, the entire machine is inclosed within a casing, preferably of sheet iron, which protects the working parts against the entrance of dust, grit or other foreign matter.

In making the starting cut, which is longitudinally from the wall of the mine, the illustrated form of machine is guided by means of a starting frame (Figs. 8 and 9) so that the starting cut will be straight and accurate. The machine is unloaded from the trucks in place upon the starting frame, but withdraws laterally from the starting frame immediately upon completing the starting cut. This frame is constructed of a pair of angle irons $p$ extending lengthwise the same at either side thereof, the said angle irons being held tight together at their forward end by the broad base plate $p'$, intermediate plate $p^2$ and the rear tie plate $p^3$. The rear part of the machine is also prevented from spreading by the channel iron $p^4$. The machine, as is represented in Fig. 9 (the bottom shoe and bed plate only being shown) is placed in the frame with the bottom shoe resting upon the horizontal flanges of the angle irons $p$. When being carried on the trucks the machine is locked to the frame by a finger $p^5$, (Figs. 9 and 14) which depends from the clutch operating lever $f^6$ when the latter is turned as shown in Figs. 9 and 14 to disconnect the motor from the sprocket wheel, the locking finger $p^5$ hangs down as shown in such position as to overlie the edge of the channel iron $p^4$, thus locking the machine within the frame. In this position a spring pressed latch $p^7$ pivoted upon the end of the cylinder head engages a notch in the upper end of the operating lever $f^6$. When the machine is ready to start the operating lever $f^6$ is turned swinging the latching finger $p^5$ into a horizontal position and thereby releasing the machine and at the same time clutching the motor to the sprocket wheel and starting up the chain. The operating lever is held in the latter position by engagement of the latching pin $p^6$ with a notch carried at the end of quadrant $p^7$. It will therefore be seen that the act of starting up the cutter chain unlocks the machine from the starting frame and furthermore that to lock the carriage in the frame power must necessarily be shut off from the cutting mechanism, thus rendering the machine safer to handle. When the starting cut is commenced, the machine having been unlatched, it is caused to feed forwardly in the starting frame from the rear toward the front thereof, the shoe sliding upon and being guided by the horizontal and upright flanges of the angle irons. In this operation the guiding wheel $h'$ of the feed chain is swung up on its bracket out of the way of the feed chain, and the leading end of the latter is fastened to the forward end of the starting frame. The rear end of the chain is secured to ratchet and pawl take-up mechanism not shown.

When the full depth of the starting cut is reached the machine is at the forward end of the frame. The feed is then started laterally and the machine draws off from the starting frame at one side thereof where the upright flange between the angle irons (the upper one in Fig. 8) is cut away. The machine then withdraws wholly from the starting frame and subsequent feeding movement takes place by direct contact of the bottom shoe upon the mine floor.

For lateral feeding movement of the machine the guide wheel $h'$ is swung down into position and the leading end of the chain passed about the same, and thence laterally to a fixed distant anchor at the side of the mine wall. The opposite end of the chain is passed out and about the guiding sprocket wheel $h^4$ and thence laterally in the opposite direction to the ratchet and pawl take-up mechanism referred to. The leading end of the chain being close to the mine wall and the rear end more remote therefrom, the machine is held up to the coal during cutting movement by the leverage exerted through its own feeding action.

It will be seen that the chain not only serves to feed the machine along the work, but that it also constitutes flexible guiding means for holding the machine to the work. For the sake of mechanical simplicity, such guiding means is herein shown as comprising two portions united into one continuous length of chain.

The idle sprocket wheel $h^4$ is carried upon the bracket $h^5$, which is swiveled upon the post $r$ (Fig. 1), so that it may be swung out into position as shown in Fig. 2 when the machine is fed laterally, but swung inwardly out of the way when the machine is making the starting cut or mounted on the tracks. To the swiveled arm is connected the brace rod $r'$, which has a forked end adapted to embrace a raised lug $r^2$ when the arm is swung out into position.

While I have shown and described one practical embodiment of my invention and one possessing great simplicity, strength and compactness, it is to be understood that my invention is not limited to the described details of construction or the particular application of the invention made herein, but that extensive modifications may be made in the described construction and wide deviations from the details disclosed without departing from the spirit of the invention.

It is also to be understood that many of the features herein disclosed are within the scope of my invention though employed separately from other features thereof.

I claim—

1. A mining machine having supporting means permitting the same to slide along the mine bottom, a cutter bar fixedly secured at one end thereof, a cutter chain, an upright sprocket wheel driving shaft provided with a sprocket wheel engaging said cutter chain, a machine frame supported upon said supporting means, an upper bearing for said sprocket wheel driving shaft in said frame, and a lower bearing in said supporting means, an upright counter-shaft mounted above said cutter bar, an overhead driving shaft for driving said counter-shaft, and a gearing connection between said counter-shaft and said sprocket wheel driving shaft.

2. A mining machine having supporting means permitting the same to slide along the mine bottom, a cutter bar secured at one end thereof, a machine frame sustained upon but above said supporting means, an engine supported upon said machine frame, a crank shaft also carried thereon, cutting mechanism, power transmitting gearing for operating the cutting mechanism from the crank shaft, said power transmitting mechanism being located between the supporting means and the machine frame.

3. A mining machine having power driven cutting mechanism, a starting frame and means for locking the machine in said starting frame while simultaneously shutting off power from said mechanism.

4. A mining machine having a cutter bar, a driving motor, a cutter chain, a cutter chain driving shaft and a counter-shaft for transmitting power from the motor to the driving shaft, said counter-shaft having a step bearing on the cutter bar.

5. A mining machine having a cutter chain, a cutter bar, a bottom plate beneath said cutter bar, an upright driving shaft for the cutter chain having a lower bearing on said plate, and power transmission devices including an upright counter-shaft also having a lower bearing supported by said plate.

6. A mining machine having a cutter chain, a fluid pressure engine with crank shaft and power transmission devices, an upper frame member, a lower frame member, in which the machine is supported for sliding movement along the mine bottom, and a cutter bar clamped between said upper and lower frame members.

7. A mining machine having a fluid pressure engine, a cutter chain, an upright driving shaft therefor, a sprocket wheel on said driving shaft, a journal bearing for said shaft below said sprocket wheel, a feeding mechanism for said machine, a frictional transmitting device between said feeding means and said driving shaft, and a thrust bearing for said transmitting device.

8. A mining machine having a lower frame member upon which the machine is adapted to slide along the mine bottom, a cutter bar secured to said lower frame member having one end projecting beyond the same, a horizontally arranged motor carried by said frame member at its opposite end, an upright driving shaft at one end of said cutter bar, connections between the motor and said shaft, a lower bearing for said shaft in said lower frame member, an upper frame member, an upper bearing for said shaft in said upper frame member, cutting mechanism upon said cutter bar and means for driving the same from said shaft.

In testimony whereof, I have signed my name to this specification, in the presence of two subscribing witnesses.

ALBERT BALL.

Witnesses:
L. WILLSON HALL,
E. J. BRUCHARD.